United States Patent
Ueda et al.

(10) Patent No.: US 12,427,706 B2
(45) Date of Patent: Sep. 30, 2025

(54) DIE, METHOD OF MANUFACTURING DIE, EXTRUSION APPARATUS, AND METHOD OF MANUFACTURING PELLETS

(71) Applicant: THE JAPAN STEEL WORKS, LTD., Tokyo (JP)

(72) Inventors: Naoki Ueda, Tokyo (JP); Tomonori Hashimoto, Tokyo (JP); Hiroyuki Kawano, Tokyo (JP); Soichiro Matsuda, Tokyo (JP); Fumiya Yamabe, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 24 days.

(21) Appl. No.: 18/282,187

(22) PCT Filed: Nov. 1, 2021

(86) PCT No.: PCT/JP2021/040304
§ 371 (c)(1),
(2) Date: Sep. 14, 2023

(87) PCT Pub. No.: WO2022/201618
PCT Pub. Date: Sep. 29, 2022

(65) Prior Publication Data
US 2024/0157623 A1 May 16, 2024

(30) Foreign Application Priority Data
Mar. 26, 2021 (JP) .................................. 2021-052668

(51) Int. Cl.
*B29C 48/30* (2019.01)
*B29B 9/06* (2006.01)
(Continued)

(52) U.S. Cl.
CPC .......... *B29C 48/3001* (2019.02); *B29B 9/065* (2013.01); *B29C 48/0022* (2019.02); *B33Y 10/00* (2014.12); *B33Y 80/00* (2014.12)

(58) Field of Classification Search
CPC ...... B29B 7/582; B29B 9/065; B29C 48/3001
See application file for complete search history.

(56) References Cited

U.S. PATENT DOCUMENTS

| | | | |
|---|---|---|---|
| 4,752,196 A | 6/1988 | Wolfe, Jr. | |
| 6,638,045 B2 | 10/2003 | Yoshii et al. | |

(Continued)

FOREIGN PATENT DOCUMENTS

| | | |
|---|---|---|
| CN | 101596753 A | 12/2009 |
| DE | 2349273 A1 | 5/1974 |

(Continued)

OTHER PUBLICATIONS

Office Action issued Jul. 23, 2024, in Japanese Patent Application No. 2021-052668.

(Continued)

*Primary Examiner* — James Sanders
(74) *Attorney, Agent, or Firm* — Potomac Law Group, PLLC

(57) ABSTRACT

A die 6 includes a central member 6a, an injection hole formed from a surface of the central member 6a to an inside, a plurality of nozzles formed from an opposite surface of the central member 6a to the inside and connected to the injection hole, a heat source provided inside the central member 6a, and a plurality of heat insulating portions 31a provided inside the central member 6a. The plurality of heat insulating portions 31a extend from an outer peripheral side of the central member 6a toward an inner side of the central member 6a in plan view.

26 Claims, 8 Drawing Sheets

(51) Int. Cl.
    *B29C 48/00*     (2019.01)
    *B33Y 10/00*     (2015.01)
    *B33Y 80/00*     (2015.01)

(56) References Cited

U.S. PATENT DOCUMENTS

| | | |
|---|---|---|
| 8,727,762 B2 | 5/2014 | Makida et al. |
| 9,481,121 B2 | 11/2016 | Robertson et al. |
| 2001/0005516 A1 | 6/2001 | Yoshii et al. |
| 2010/0040716 A1 | 2/2010 | Fridley |
| 2012/0207864 A1 | 8/2012 | Fridley |
| 2014/0328961 A1 | 11/2014 | Fridley |
| 2020/0283876 A1 | 9/2020 | Beste |

FOREIGN PATENT DOCUMENTS

| | | |
|---|---|---|
| JP | S51-032660 B1 | 9/1976 |
| JP | H11-277528 A | 10/1999 |
| JP | 2001-179734 A | 7/2001 |
| JP | 2012-500131 A | 1/2012 |
| WO | 2011/135512 A1 | 11/2011 |
| WO | 2019/103686 A1 | 5/2019 |
| WO | 2019/219892 A1 | 11/2019 |

OTHER PUBLICATIONS

International Search Report for International Patent Application No. PCT/JP2021/040304, Dec. 14, 2021.
Partial European Search Report and Provisional Opinion issued Mar. 27, 2025, in European Patent Application No. 21933216.0.
Extended European Search Report and European Search Opinion issued Jul. 7, 2025, in European Patent Application No. 21933216.0.

DIE, METHOD OF MANUFACTURING DIE, EXTRUSION APPARATUS, AND METHOD OF MANUFACTURING PELLETS

TECHNICAL FIELD

The present invention relates to a die, a method of manufacturing a die, an extrusion apparatus provided with a die, and a method of manufacturing pellets using an extrusion apparatus, and can be suitably applied to, for example, a die having a heat insulating layer.

BACKGROUND ART

Conventionally, in the manufacture of pellets of filler-containing thermoplastic resin (for example, polypropylene (PP) compound), there has been a problem of a phenomenon (clogging) in which molten resin solidifies in a nozzle hole provided inside a die when the molten resin passes through the nozzle hole.

For example, Patent Document 1 discloses a technique of providing an air chamber for heat insulation between a die surface and a cover plate around nozzle holes provided inside a die plate body.

RELATED ART DOCUMENTS

Patent Documents

Patent Document 1: International Patent Application Publication No. 2012/500131

SUMMARY OF THE INVENTION

Problems to be Solved by the Invention

By providing a heat insulating layer inside a die, it is expected to suppress a phenomenon (clogging) in which molten resin solidifies in a nozzle hole inside the die when the resin passes through the nozzle hole. However, if the heat insulating layer provided inside the die is small, the effect of suppressing the phenomenon in which the resin solidifies in the nozzle hole becomes small. On the other hand, if the heat insulating layer provided inside the die is large, the strength of the die is reduced and the resulting problem may occur. Therefore, it is desired to satisfy both the performance and strength of the die.

Other problems and novel features will be apparent from the descriptions of this specification and accompanying drawings.

Means for Solving the Problem

A die according to an embodiment includes a first member made of a first metal material, an injection hole formed from a surface of the first member to an inside of the first member, a plurality of nozzles formed from a surface on an opposite side of the surface to the inside of the first member and connected to the injection hole, a heat source provided inside the first member, and a plurality of first heat insulating portions provided inside the first member. The plurality of first heat insulating portions extend from an outer peripheral side of the first member toward an inner side of the first member in plan view.

Effects of the Invention

According to an embodiment, it is possible to improve the performance of the die and the performance of the extrusion apparatus provided with the die. Further, it is also possible to improve the quality of the pellets manufactured using the extrusion apparatus.

BRIEF DESCRIPTIONS OF THE DRAWINGS

DETAILED DESCRIPTION OF PREFERRED EMBODIMENTS

Figure 1:
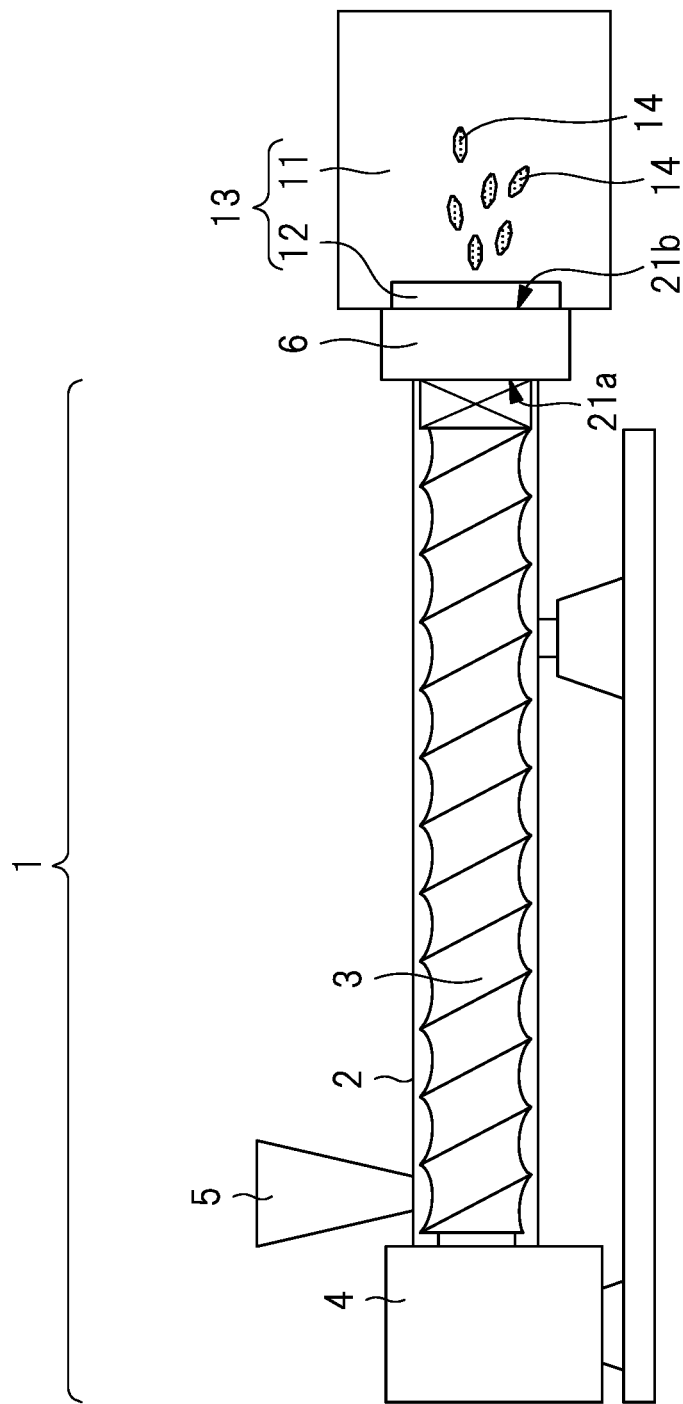
FIG. 1 is a schematic diagram showing an extrusion apparatus according to an embodiment.

Hereinafter, an embodiment will be described in detail with reference to drawings. Note that the members having the same function are denoted by the same reference characters throughout the drawings for describing the embodiment, and the repetitive description thereof will be omitted. Also, in the following embodiment, the description of the same or similar parts will not be repeated in principle unless particularly required.

Also, in the drawings used in the description of the embodiment, hatching may be omitted even in a cross-sectional view and hatching may be applied even in a plan view so as to make the drawings easily understood.

Embodiment

Configuration Example of Extrusion Apparatus

FIG. 1 is a schematic diagram showing an extrusion apparatus (extruder) 1 according to the present embodiment. In FIG. 1, a screw 3 in a cylinder 2 is shown so as to be seen through the cylinder 2 for easy understanding.

First, a schematic configuration of the extrusion apparatus 1 will be described with reference to FIG. 1. The extrusion apparatus 1 shown in FIG. 1 includes a cylinder (barrel) 2, a screw 3 rotatably (freely rotatably) arranged in the cylinder 2, a rotation drive mechanism 4 for rotating the screw 3 in the cylinder 2, a hopper (resin input unit) 5 arranged on an upstream side (rear end side) of the cylinder 2, and a die (mold) 6 attached to a tip end (end on downstream side) of the cylinder 2. The hopper 5 is connected to an upper surface of the cylinder 2, and a resin material can be supplied into the cylinder 2 via the hopper 5. The temperature of the cylinder 2 is controlled by temperature adjusting means (temperature adjusting mechanism) (not shown) such as a heater. The extrusion apparatus 1 may further include a filler feeder (not shown) connected to the cylinder 2, and the desired filler can be supplied into the cylinder 2 from the filler feeder in that case. In addition, the extrusion apparatus 1 may further include a liquid injection nozzle (not shown)

connected to the cylinder 2, and the desired additive or the like can be supplied into the cylinder 2 from the liquid injection nozzle in that case.

When referring to the "downstream side" and the "upstream side" with respect to the extrusion apparatus 1, the "downstream side" means the downstream side of the resin flow in the extrusion apparatus 1, and the "upstream side" means the upstream side of the resin flow in the extrusion apparatus 1. Therefore, in the extrusion apparatus 1, the side close to an extrusion surface 21b of the die 6 is the downstream side, and the side far from the extrusion surface 21b of the die 6, that is, the side close to the hopper 5 is the upstream side.

Inside the cylinder 2, two screws 3 are rotatably (freely rotatably) inserted and arranged. Therefore, the extrusion apparatus 1 can also be regarded as a twin-screw extrusion apparatus (twin-screw extruder). The two screws 3 arranged inside the cylinder 2 rotate while meshing with each other. The longitudinal direction (long side direction, axial direction, extending direction) of the cylinder 2 and the longitudinal direction (long side direction, axial direction, extending direction) of the screw in the cylinder 2 are the same.

In the present embodiment, the case in which the number of screws 3 in the cylinder 2 is two is described, but the number of screws 3 in the cylinder 2 may be one as another aspect. However, since the spatial volume can be increased when the number of screws 3 in the cylinder 2 is two, the supply capacity of the raw material can be increased in the case of double screws (two screws 3) as compared with the case of single screw (one screw 3) if the screws have the same diameter.

The die 6 can function to discharge a molten resin extruded from the cylinder 2 of the extrusion apparatus 1 while molding it into a predetermined cross-sectional shape (here, string-like shape) Therefore, the die 6 is a die (mold) for extrusion molding.

In this application, "melting" is not limited to melting with heat, but includes melting with a solvent or the like. For this reason, the resin melted with a solvent, the resin melted with microwaves, and the like may also be included in the "molten resin" in addition to the resin melted by heating. Further, liquid resin may also be included in the "molten resin".

A tip end (end on downstream side) of the cylinder 2 is connected to the die 6. The die 6 of the extrusion apparatus 1 is attached to a pelletizer 13 including a water tank (circulation box) 11 and a cutter holder 12. The pelletizer 13 can also be regarded as a part of the extrusion apparatus 1.

The die 6 has an injection surface (upstream surface) 21a and the extrusion surface (downstream surface) 21b, which are surfaces located opposite each other, the injection surface 21a of the die 6 is connected to the tip end of the cylinder 2, and the extrusion surface 21b of the die 6 is arranged in the water tank 11. The inside of the water tank 11 is filled with a liquid referred to as pellet circulating water (PCW). The liquid that constitutes the pellet circulating water is, for example, water.

The cutter holder 12 is provided inside the water tank 11 and arranged near the extrusion surface 21b of the die 6. A plurality of cutters (cutting blades) are provided in the cutter holder 12 so as to face the extrusion surface 21b of the die 6, and the resin material extruded from the extrusion surface 21b is cut by the cutters in the pellet circulating water and divided into pieces of pellets (resin pellets) 14.

<Method of Manufacturing Pellets>

A method of manufacturing pellets will be described with reference to FIG. 1.

In the extrusion apparatus 1, the resin material (thermoplastic resin) supplied from the hopper 5 into the cylinder 2 is melted while being sent forward by the rotation of the screws 3 in the cylinder 2 (that is, becomes molten resin). In the case where the filler is supplied into the cylinder 2 from the filler feeder (not shown), the resin (molten resin) and the filler are kneaded by the rotation of the screws 3 in the cylinder 2 of the extrusion apparatus 1, and thus the filler is contained in the molten resin in the cylinder 2.

In the extrusion apparatus 1, molten resin (resin material) sent forward in the cylinder 2 by the rotation of the screws 3 is extruded from the die 6 attached to the tip end of the cylinder 2. In addition, the die 6 has a nozzle 24 described later for discharging the molten resin, and the molten resin is extruded (discharged) from the nozzle 24 of the die 6. The die 6 of the extrusion apparatus 1 is connected to the water tank 11, and the water tank 11 is filled with pellet circulating water. Therefore, the molten resin is extruded from the nozzle 24 of the die 6 of the extrusion apparatus 1 into the pellet circulating water in the water tank 11. The molten resin (resin material) extruded from the nozzle 24 of the die 6 into the pellet circulating water in the water tank 11 is cut one after another by the cutters attached to the cutter holder 12, and is cooled and solidified by the pellet circulating water. In this way, pellets (resin pellets) 14 are formed (molded). Thereafter, the pellets 14 are transferred to the outside of the water tank 11. In the manner described above, a plurality of pellets 14 can be obtained using the extrusion apparatus 1 of the present embodiment.

Further, in the present embodiment, the case in which the molten resin (resin material) is extruded from the nozzle 24 of the die 6 into the water tank 11 (pellet circulating water) and cut by the cutter has been described. As another aspect, the case in which the molten resin (resin material) is extruded into the air (outside the die 6) from the nozzle 24 of the die 6 and cut by the cutter without providing the water tank 11 is also possible.

<Die Structure>

Figure 2:
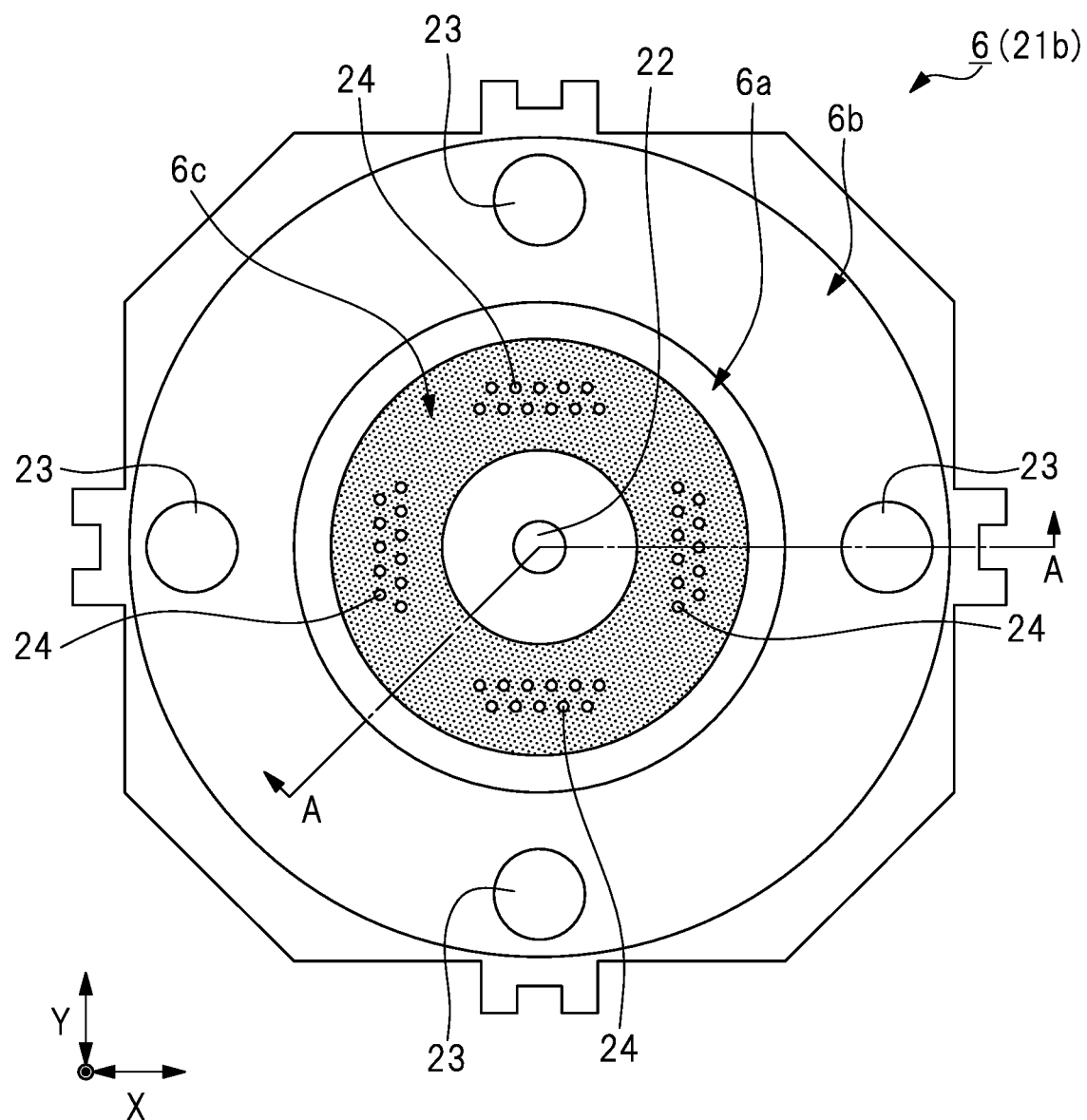
FIG. 2 is a plan view showing a die according to the embodiment.
Figure 3:
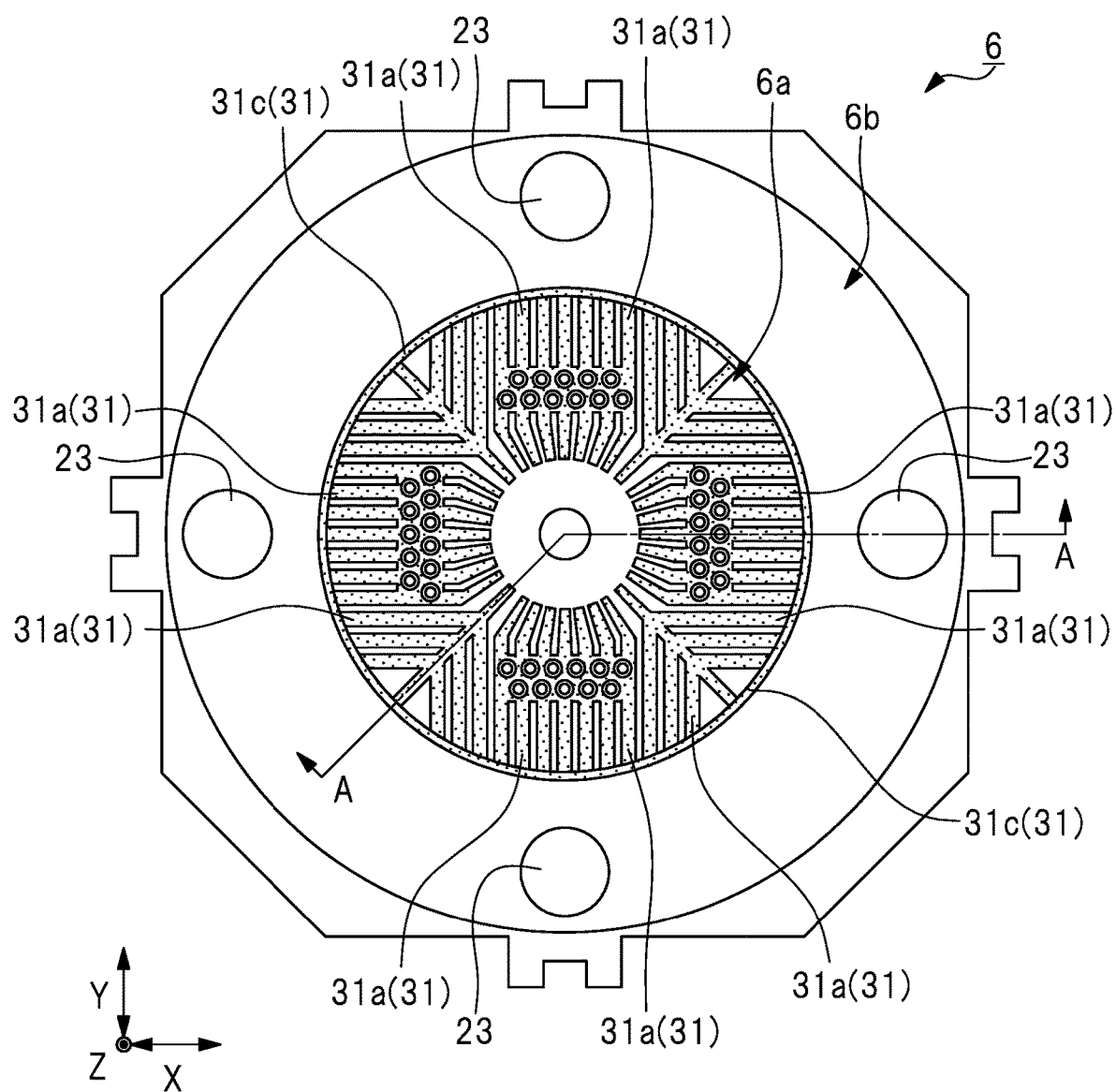
FIG. 3 is a transparent plan view showing the die according to the embodiment.
Figure 4:
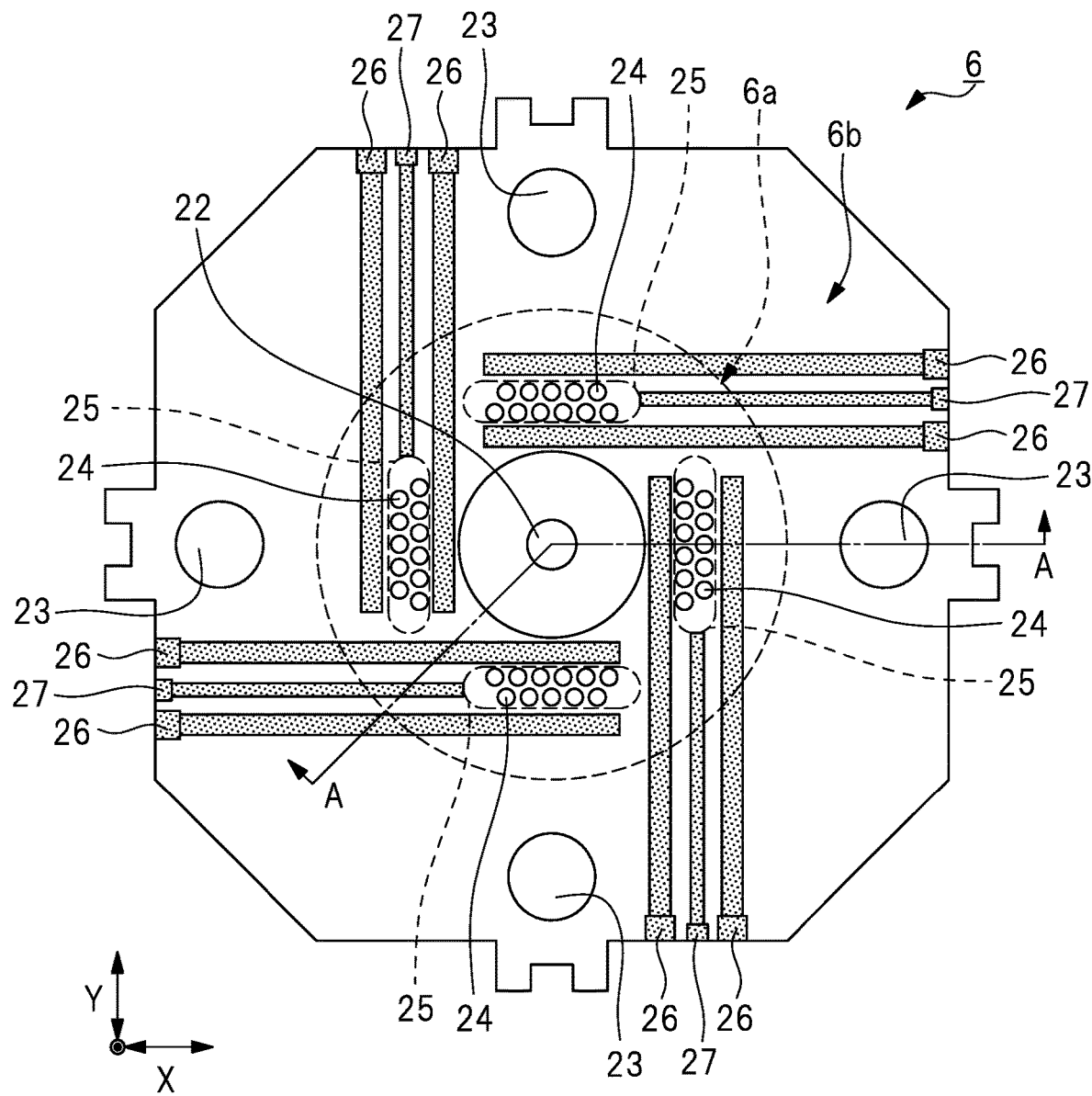
FIG. 4 is a transparent plan view showing the die according to the embodiment.
Figure 5:
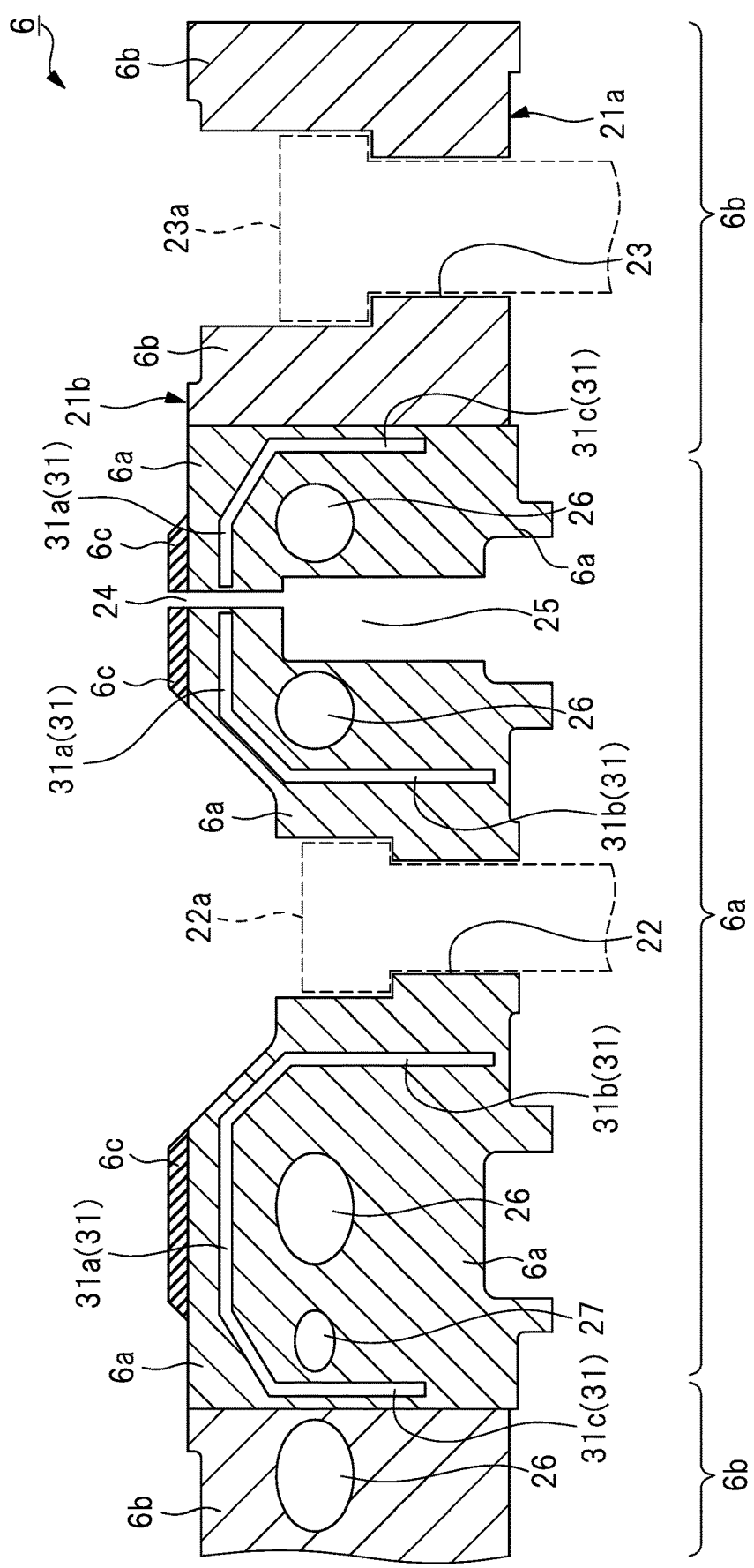
FIG. 5 is a cross-sectional view showing the die according to the embodiment.
Figure 6:
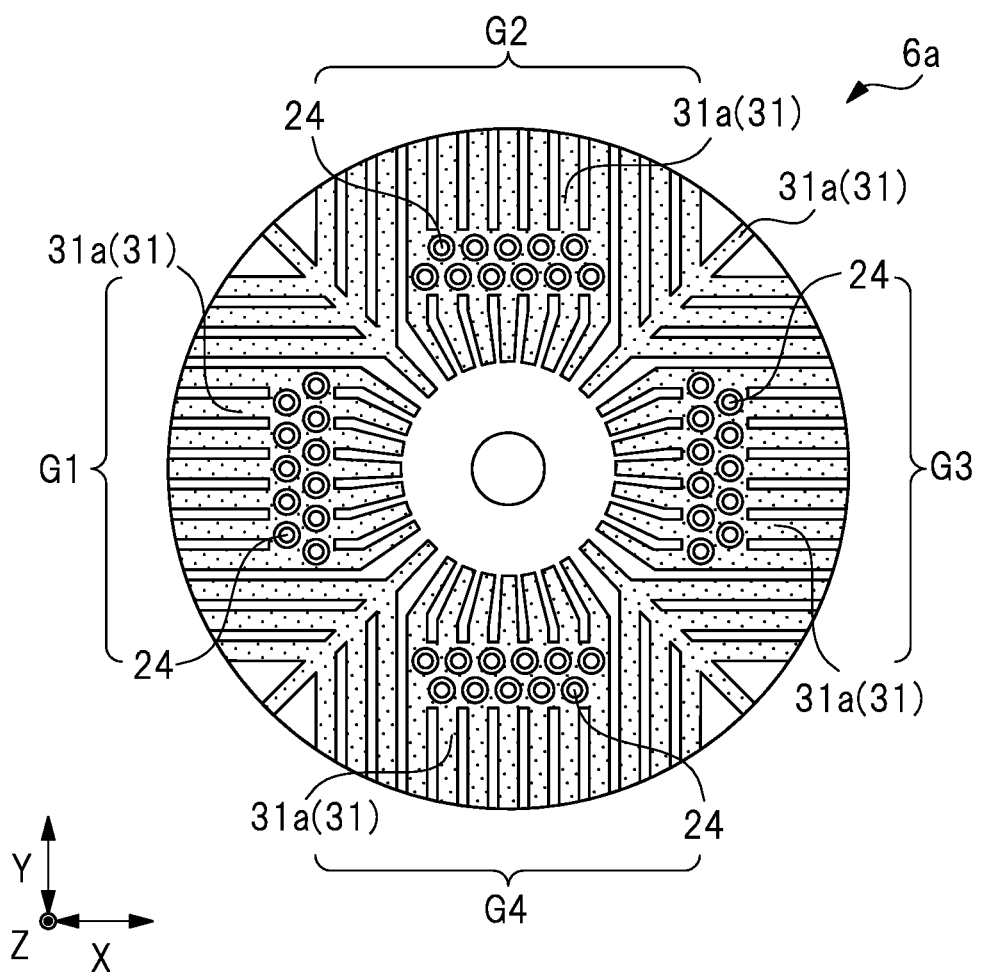
FIG. 6 is a partially enlarged view showing a part of FIG. 3 in an enlarged manner.
Figure 7:
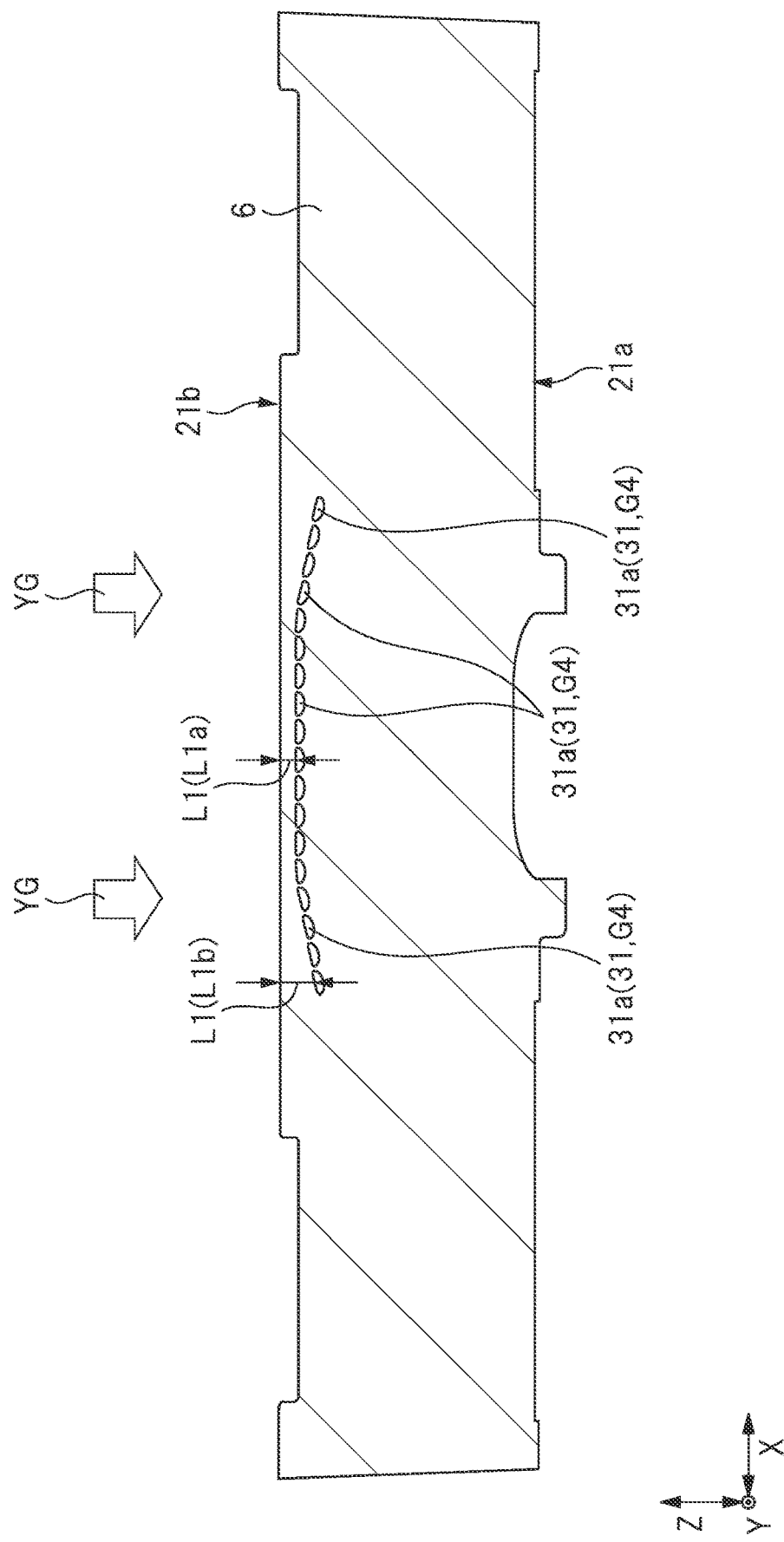
FIG. 7 is a cross-sectional view showing the die according to the embodiment.
Figure 8:
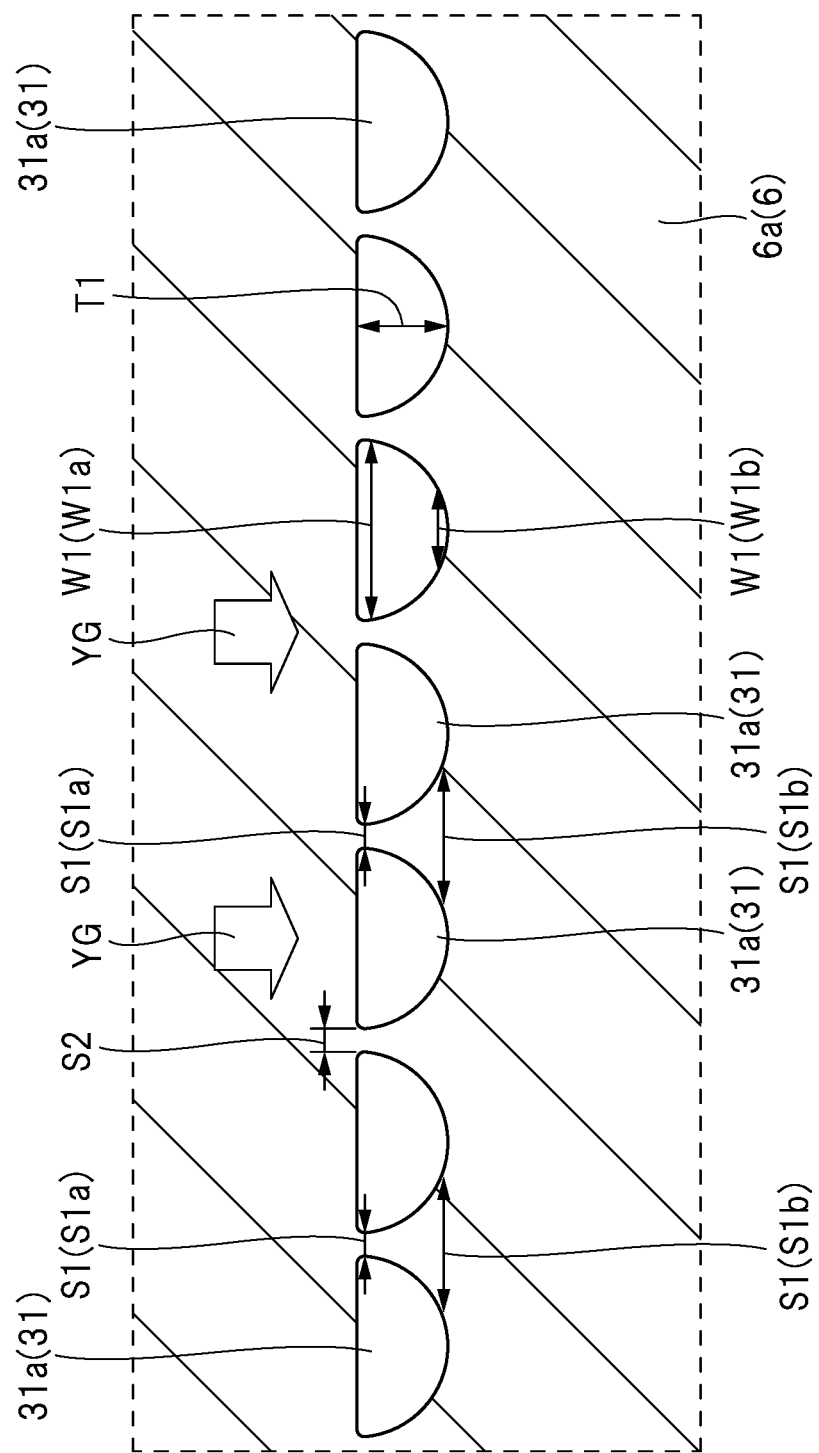
FIG. 8 is a partially enlarged view showing a part of FIG. 7 in an enlarged manner.

The structure of the die 6 according to the present embodiment will be described with reference to FIG. 2 to FIG. 8. FIG. 2 is a plan view of the die 6 seen from the side of the extrusion surface 21b. Although FIG. 2 is a plan view, a hard plate 6c is shown by hatching with dots to make the drawing easily understood. FIG. 3 and FIG. 4 are transparent plan views showing the die 6 seen from the side of the extrusion surface 21b. In FIG. 3, a heat insulating layer 31 in the die 6 is shown by hatching with dots. Also, in FIG. 4, a heat source 26 and a heat sensor 27 in the die 6 are shown by hatching with dots. FIG. 5 is a cross-sectional view of the die 6. A cross-sectional view taken along the line A-A shown in FIG. 2 to FIG. 4 substantially corresponds to FIG. 5. FIG. 6 is a partially enlarged view showing a part of FIG. 3 in an enlarged manner. FIG. 7 is a cross-sectional view of the die 6, and FIG. 8 is a partially enlarged view (partially enlarged cross-sectional view) showing a part of FIG. 7 in an enlarged manner.

In the description of the structure of the die 6 in this application, "plan view" means a view showing a plane parallel to the extrusion surface 21b or the injection surface 21a, and "in plan view" means seeing from the side of the extrusion surface 21b or the injection surface 21a. Further, "cross-section view" means a view showing a plane substantially perpendicular to the extrusion surface 21b or the injection surface 21a, and "in cross-sectional view" means seeing the perpendicular plane. Further, in this application, for the sake of convenience, each configuration may be described with the side of the injection surface 21a set as the lower side and the side of the extrusion surface 21*b* set as the upper side in cross-sectional view.

Further, in this application, the "injection surface 21*a*" indicates the entire surface of the die 6 on the side connected to the cylinder 2 (that is, upstream side), and the "extrusion surface 21*b*" indicates the entire surface of the die 6 on the side connected to the water tank 11 (that is, downstream side). More specifically, the "injection surface 21*a*" is the surface of the die 6 on which an injection hole 25 is open, and the "extrusion surface 21*b*" is the surface of the die 6 on which the nozzle 24 is open or the surface of the hard plate 6*c* on which the nozzle 24 is open.

As shown in FIG. 2 to FIG. 8, the die 6 has a central member 6*a* and an outer peripheral member 6*b* surrounding the central member 6*a*. The outer peripheral member 6*b* surrounds the central member 6*a* in plan view. The central member 6*a* and the outer peripheral member 6*b* are members manufactured separately, and are joined and integrated together by welding or the like. Namely, the outer peripheral member 6*b* is joined to the central member 6*a* so as to surround the central member 6*a* in plan view. Further, the central member 6*a* and the outer peripheral member 6*b* are each made of a metal material (for example, stainless steel), but may be made of different materials (different types of stainless steel).

The die 6 is provided with connection holes 22 and 23 for connecting with other members (for example, the cylinder 2). Here, one connection hole 22 is provided at the central portion of the central member 6*a* so as to penetrate the central member 6*a*, and four connection holes 23 are provided in the outer peripheral member 6*b* so as to penetrate the outer peripheral member 6*b*. As indicated by broken lines in FIG. 5, the die 6 and the cylinder 2 are connected by providing connection members 22*a* and 23*a* such as bolts in the connection holes 22 and 23, respectively.

Since the cutters provided in the cutter holder 12 are operated on the side of the extrusion surface 21*b*, the peripheral portions of the connection holes 22 and 23 are formed so as to be recessed toward the injection surface 21*a* as compared with other portions such that the connection members 22*a* and 23*a* do not protrude from the die 6 and are not scraped.

Also, the die 6 further includes the hard plate (plate member) 6*c* provided on the surface of the central member 6*a* on the side of the extrusion surface 21*b*. The hard plate 6*c* is made of a material having higher hardness than that of the material (metal material) constituting the central member 6*a*. Namely, the hard plate 6*c* has higher hardness than (the metal material constituting) the central member 6*a*. Further, the hard plate 6*c* is made of a material having higher hardness than that of the material (metal material) constituting the outer peripheral member 6*b*. The hard plate 6*c* is made of, for example, a material containing titanium carbide (TiC) and has a thickness of, for example, 1 to 5 mm. The hard plate 6*c* and the central member 6*a* are joined together by, for example, brazing using a self-fluxing alloy. Since the hard plate 6*c* having high hardness is provided on the side of the extrusion surface 21*b*, it is possible to suppress the fear that the central member 6*a* is scraped by the cutters provided in the cutter holder 12.

Further, a plurality of nozzles (holes) 24 are provided in the central member 6*a* and the hard plate 6*c*. Each nozzle 24 has a portion formed in the central member 6*a* and a portion formed in the hard plate 6*c*, which communicate with each other. Namely, the nozzles 24 in the central member 6*a* and the nozzles 24 in the hard plate 6*c* communicate with each other to form integrated nozzles. Therefore, the nozzles 24 penetrate the hard plate 6*c*. Further, a plurality of injection holes 25 are provided in the central member 6*a*, and the plurality of nozzles 24 communicate (are spatially connected) with each injection hole 25. Therefore, the end (end on upstream side) of each nozzle 24 is connected (leads) to the injection hole 25.

In the case of FIG. 2 to FIG. 4, four injection holes 25 are provided in the central member 6*a*, and eleven nozzles 24 communicate with each injection hole 25, so that a total of forty four nozzles 24 are provided. Note that the number of nozzles 24 communicating with each injection hole 25 is not limited to eleven, and may be changed to any number (preferably plural) as appropriate. Also, although the number of injection holes 25 provided in the central member 6*a* is preferably four, it may be changed to any number (single or plural) other than four.

In the extrusion apparatus 1, the molten resin that has been sent forward (toward downstream side) in the cylinder 2 by the rotation of the screws 3 is injected from the cylinder 2 into the die 6. At this time, the molten resin is injected into the injection hole 25 on the side of the injection surface 21*a*. The molten resin that has been injected into the injection hole 25 from the cylinder 2 passes through the nozzle 24 communicating with the injection hole 25 and is extruded from the extrusion surface 21*b* to the outside of the die 6 (specifically, the water tank 11).

The injection hole 25 is formed from the surface of the central member 6*a* on the side of the injection surface 21*a* to the inside of the central member 6*a*, has a relatively wide opening area, and is connected to the plurality of nozzles 24.

The nozzle 24 penetrates the hard plate 6*c*, is formed from the surface of the central member 6*a* on the side of the extrusion surface 21*b* to the inside of the central member 6*a*, and is connected to the injection hole 25. The opening area (opening diameter) of the nozzle 24 is smaller than the opening area of the injection hole 25.

Further, as shown in FIG. 4 and FIG. 5, the die 6 is provided with a plurality of heat sources (heaters) 26 for mainly heating the periphery of the injection hole 25 and the nozzle 24 and thermal sensors 27 for measuring a heating temperature by the plurality of heat sources 26.

Each heat source 26 is provided so as not to be in direct contact with the injection hole 25 and the nozzle 24, and therefore each heat source 26 is provided at a position not overlapping the injection hole 25 and the nozzle 24 in plan view. Further, if the adjacent heat sources 26 are arranged so as to sandwich the injection hole 25 in plan view, it is possible to efficiently heat the molten resin passing through the injection hole 25 and the nozzle 24 by the heat from the heat sources 26.

The heat source 26 is composed of holes formed in the outer peripheral member 6*b* and the central member 6*a* and a heating mechanism provided inside the holes. Examples of such heating mechanism include an electric heater using coils or heat transfer rods, hot oil, steam, and the like. In FIG. 4 and FIG. 5, as an example of the heat source 26, a structure assuming the use of an electric heater (cartridge heater) is adopted. When hot oil or steam is used as the heating mechanism, for example, the tip ends of the two adjacent holes (holes constituting the heat source 26) are connected via the heat sensor 27, and these may be used as a circulation path. In that case, one of the holes may be used as an inlet and the other hole may be used as an outlet. The holes thus connected and hot oil or steam circulating inside the holes can also be adopted as the heat source 26.

As shown in FIG. 3 and FIG. 5 to FIG. 8, the die 6 is provided with the heat insulating layer (heat insulating portions) 31.

The heat insulating layer 31 is composed of holes provided in the die 6. Namely, the heat insulating layer 31 is composed of cavities (spaces) in which the metal material constituting the die 6 does not exist. The pressure of the gas in the holes (cavities) constituting the heat insulating layer 31 is preferably an atmospheric pressure, a reduced pressure lower than the atmospheric pressure, or vacuum. It is also possible to make the pressure of the gas in the holes (cavities) constituting the heat insulating layer 31 higher than the atmospheric pressure, but in that case, it becomes difficult to form the heat insulating layer 31. Further, when the pressure of the gas in the holes (cavities) constituting the heat insulating layer 31 is a reduced pressure or vacuum, the heat insulating effect by the heat insulating layer 31 can be enhanced as compared with the case of the atmospheric pressure.

A predetermined gas (gaseous matter) is present (fills) in the holes (cavities) constituting the heat insulating layer 31, and air, nitrogen gas, inert gas (for example, argon gas), or the like can be applied as the gas in the holes (cavities) constituting the heat insulating layer 31. It is preferable that the holes (cavities) constituting the heat insulating layer 31 are not connected to the space outside the die 6 and are sealed.

Further, it is also possible to fill the holes (cavities) constituting the heat insulating layer 31 with liquid or solid instead of gas. However, the case in which the holes (cavities) constituting the heat insulating layer 31 are filled with gas is more preferable than the case in which they are filled with liquid or solid because it is easier to form the heat insulating layer 31 and the heat insulating effect by the heat insulating layer 31 can be more easily enhanced. In any case, the heat insulating layer 31 has a thermal conductivity lower than those of the material constituting the central member 6a, the material constituting the outer peripheral member 6b, and the material constituting the hard plate 6c. Since the heat insulating layer 31 has a thermal conductivity lower than that of the material surrounding the heat insulating layer 31, the heat insulating layer 31 can function to hinder the transfer (conduction) of heat in the die 6. In other words, in the die 6, it is possible to suppress or prevent the heat transfer (conduction) through the heat insulating layer 31.

The main features of the present embodiment are the arrangement and shape of the heat insulating layer 31 provided in the die 6, and they will be described in more detail later. In the present embodiment, by devising the arrangement and shape of the heat insulating layer 31 provided in the die 6, the heat insulating effect by the heat insulating layer 31 can be enhanced, and the decrease in the strength of the die 6 due to the provision of the heat insulating layer 31 can be suppressed. As a result, it is possible to appropriately suppress or prevent the occurrence of clogging due to the reduction in the temperature of the resin material inside the nozzle 24 of the die 6 and to prevent the defect that may occur when the strength of the die 6 is decreased. Therefore, it is possible to improve the performance of the die 6 and the performance of the extrusion apparatus 1 provided with the die 6. Moreover, it is possible to improve the quality of resin products (here, pellets) manufactured using the extrusion apparatus 1.

Background of Study

As described above, the resin material kneaded inside the cylinder 2 is extruded from the extrusion surface 21b of the die 6 (specifically, from the nozzle 24) into the water tank 11, and is divided into pieces of pellets 14 by the cutters provided in the cutter holder 12. At this time, the inside of the water tank 11 is filled with pellet circulating water (for example, water), and the temperature of the pellet circulating water is, for example, about 60° C. Since the resin material extruded from the nozzle 24 of the die 6 into the water tank 11 is cooled by the pellet circulating water in the vicinity of the extrusion surface 21b, it hardens to a certain degree of hardness or the viscosity thereof increases, so that it can be easily cut by the cutter.

On the other hand, it is preferable that the resin material has a relatively low viscosity inside each of the injection hole 25 and the nozzle 24 of the die 6 so that the resin material is stably extruded from the nozzle 24 of the die 6 into the water tank 11. For this reason, the die 6 is provided with a plurality of heat sources 26, and the temperature of each heat source 26 is set to a temperature suitable for the type of resin. The viscosity of the resin material changes depending on the temperature of the resin material.

Here, since the hard plate 6c is in direct contact with the water tank 11, the cooling effect from the water tank 11 dominates the heating effect from the heat source 26 in the region from the surface of the hard plate 6c to a certain depth. Further, the opening diameter of the nozzle 24 (opening diameter at the extrusion surface 21b) which almost determines the size of the pellet 14 is quite small, for example, about 1 to 4 mm. Therefore, if the resin material hardens inside the nozzle 24, it becomes difficult to extrude the resin material from the nozzle 24 and clogging occurs inside the nozzle 24.

In addition, the die 6 is provided with a plurality of nozzles 24, and the degree of clogging in each of the nozzles 24 tends to vary if there is the variation in temperature around each of the nozzles 24, so that the nozzles 24 without clogging and the nozzles 24 with clogging may coexist in some cases. As a result, the size of the pellets 14 extruded from the nozzles 24 of the die 6 varies, and it becomes difficult to manufacture the pellets 14 of uniform size. Therefore, it is required to suppress or prevent the occurrence of clogging in each of the nozzles 24 of the die 6.

Accordingly, in the die 6, it is preferable that the viscosity of the resin material is low up to the region as close to the water tank 11 as possible, and it is preferable that the resin material is hardened or the viscosity of the resin material is increased to an extent suitable for cutting immediately before being extruded into the water tank 11. For example, in the nozzle 24 of the die 6, the viscosity of the resin material is preferably low in the region near the injection hole 25, and the viscosity of the resin material is preferably increased to an extend suitable for cutting or the resin material is preferably hardened in the region near the extrusion surface 21b (that is, the region near the tip end of the nozzle 24).

Therefore, the inventors of this application have been studying the provision of a heat insulating layer (corresponding to the heat insulating layer 31 described above) in the die 6. By providing the heat insulating layer, the cooling effect from the water tank 11 can be blocked by the heat insulating layer, so that the viscosity of the resin material can be kept low up to the region close to the water tank 11 in the die 6. When providing the heat insulating layer in the die 6, it is desirable to enhance the heat insulating effect by the heat insulating layer. This is because, even when the heat insulating layer is provided in the die 6, it is difficult to keep the viscosity of the resin material low up to the region close to the water tank 11 in the die 6 and the clogging of the nozzle 24 cannot be prevented if the heat insulating effect by the heat insulating layer is low.

As described above, by providing the heat insulating layer in the die 6, it is expected to suppress the phenomenon (clogging) in which the resin solidifies in the nozzle 24 when the molten resin passes through the nozzle 24 in the die 6. However, if the heat insulating layer provided in the die 6 is small, the effect of suppressing the phenomenon (clogging) in which the resin solidifies in the nozzle 24 is reduced. On the other hand, if the heat insulating layer provided in the die 6 is large, there is a concern that the strength of the die 6 is decreased and defects associated with it may occur.

Main Features and Effects

The die 6 includes the central member 6a, the injection hole 25 formed from the surface of the central member 6a on the side of the injection surface 21a to the inside of the central member 6a, the plurality of nozzles 24 formed from the surface of the central member 6a on the side of the extrusion surface 21b to the inside of the central member 6a and connected to the injection hole 25, the heat source 26 provided inside the central member 6a, and the heat insulating layer 31 provided inside the central member 6a.

The first feature of the present embodiment is that the heat insulating layer 31 includes a plurality of heat insulating portions 31a extending from the outer peripheral side of the central member 6a toward the inner side of the central member 6a in plan view. Namely, the plurality of heat insulating portions 31a extending from the outer peripheral side of the central member 6a toward the inner side of the central member 6a in plan view are provided inside the central member 6a. Specifically, the plurality of heat insulating portions 31a radially extend from the central side of the central member 6a toward the outer peripheral side of the central member 6a in plan view. The plurality of heat insulating portions 31a provided inside the central member 6a may be (spatially) connected to each other.

By applying the first feature, it is possible to efficiently arrange the plurality of heat insulating portions 31a in the central member 6a of the die 6. Therefore, the total area of the heat insulating layer 31 in the central member 6a of the die 6 in plan view can be increased, and the heat insulating effect by the heat insulating layer 31 can be enhanced. Therefore, the occurrence of clogging in each nozzle 24 can be appropriately suppressed or prevented.

In addition, by applying the first feature, the plurality of heat insulating portions 31a can be evenly arranged in the central member 6a, and thus the ambient temperature of each nozzle 24 is less likely to vary. As a result, since the degree of clogging in each nozzle 24 is less likely to vary, the pellets 14 having a uniform size can be manufactured.

Therefore, the performance of the die 6 and the performance of the extrusion apparatus 1 provided with the die 6 can be improved. Moreover, the quality of the pellets 14 manufactured using the extrusion apparatus can be improved.

In addition, in the central member 6a of the die 6, the injection hole 25 is located between the surface of the central member 6a on the side of the injection surface 21a and the plurality of heat insulating portions 31a. Moreover, the injection hole 25 preferably overlaps with at least a part of the plurality of heat insulating portions 31a in a plan view. In this way, the cooling effect from the water tank 11 can be blocked by the plurality of heat insulating portions 31a, and the temperature of the resin material in the injection hole 25 can be maintained at an appropriate temperature. Therefore, the viscosity of the resin material in the injection hole 25 can be set to an appropriate viscosity (low viscosity), whereby the clogging in each nozzle 24 can be suppressed or prevented.

In addition, in the central member 6a of the die 6, the heat source 26 is located between the surface of the central member 6a on the side of the injection surface 21a and the plurality of heat insulating portions 31a. Thus, in the central member 6a of the die 6, the region on the side of the injection surface 21a with respect to the plurality of heat insulating portions 31a can be accurately heated by the heat source 26. Therefore, in the central member 6a of the die 6, the viscosity of the resin material can be set to an appropriate viscosity (low viscosity) in the region on the side of the injection surface 21a with respect to the plurality of heat insulating portions 31a, so that the clogging in each nozzle 24 can be suppressed or prevented.

Also, in the central member 6a of the die 6, the plurality of nozzles 24 pass between the plurality of heat insulating portions 31a. From another point of view, in the central member 6a of the die 6, the plurality of heat insulating portions 31a are arranged so as to avoid the nozzles 24 and so as not to overlap the plurality of nozzles 24. In this way, the cooling effect from the water tank 11 can be blocked by the heat insulating layer 31 in the region on the side of the injection surface 21a with respect to the plurality of heat insulating portions 31a inside the nozzle 24, and the temperature of the resin material inside the nozzle 24 can be maintained at an appropriate temperature. Therefore, in the region on the side of the injection surface 21a with respect to the plurality of heat insulating portions 31a, the viscosity of the resin material in the nozzles 24 can be set to an appropriate viscosity (low viscosity), so that the clogging in each nozzle 24 can be suppressed or prevented.

By the way, when the pellets 14 are manufactured using the extrusion apparatus 1, a load is generated in the die 6 from the side of the extrusion surface 21b toward the side of the injection surface 21a. Namely, the load is generated in the direction of arrows YG shown in FIG. 7 and FIG. 8. This is because the resin material (molten resin) extruded from the nozzle 24 of the die 6 of the extrusion apparatus 1 is cut by the cutter attached to the cutter holder 12 to manufacture the pellets 14 and the cutter is rotated while being pressed to the extrusion surface 21b of the die 6 at that time. Thus, since a load caused by pressing the cutter to the side of the extrusion surface 21b of the die 6 is generated in the die 6, a load is generated in the die 6 from the side of the extrusion surface 21b toward the side of the injection surface 21a.

However, although the heat insulating effect by the heat insulating portions 31a can be efficiently obtained when the first feature is adopted, there is a concern that the mechanical strength of the central member 6a is decreased due to the provision of the heat insulating portions 31a and the central member 6a may be deformed when a load is generated from the side of the extrusion surface 21b toward the side of the injection surface 21a in the die 6. This is because the heat insulating layer 31, that is, the heat insulating portions 31a included in the heat insulating layer 31 is composed of the holes (cavities) provided in the central member 6a.

More specifically, this is because it is composed of the holes (cavities) provided in the central member 6a and the gas existing inside the holes (cavities). The increase in the total area of the heat insulating portions 31a in the central member 6a of the die 6 in plan view leads to the decrease in the mechanical strength of the central member 6a. If the central member 6a is deformed due to the decrease in the mechanical strength, the quality of the pellets 14 manufactured using the extrusion apparatus may be deteriorated.

Therefore, in the present embodiment, in order to suppress or prevent the decrease in the mechanical strength of the central member 6a due to the provision of the heat insulating portions 31a, the cross-sectional shape of the heat insulating portions 31a provided in the central member 6a is devised. Namely, as the second feature of the present embodiment, the cross-sectional shape of each of the plurality of heat insulating portions 31a provided in the central member 6a is such that an interval S1 (see FIG. 8) between the adjacent heat insulating portions 31a gradually increases as approaching from the side of the extrusion surface 21b toward the side of the injection surface 21a. In this case, as for the interval S1 between the adjacent heat insulating portions 31a, an interval S1b at the position on the side closer to the injection surface 21a is larger than an interval S1a at the position on the side closer to the extrusion surface 21b (that is, S1a<S1b).

From another point of view, the second feature can also be expressed as follows. That is, the cross-sectional shape of each of the plurality of heat insulating portions 31a provided in the central member 6a is such that a width W1 (see FIG. 8) of the heat insulating portion 31a gradually decreases as approaching from the side of the extrusion surface 21b toward the side of the injection surface 21a. In this case, as for the width W1 of the heat insulating portion 31a, a width W1b at the position on the side closer to the injection surface 21a is smaller than a width W1a at the position on the side closer to the extrusion surface 21b (that is, W1a>W1b). If the width W1 of the heat insulating portion 31a gradually decreases as approaching from the side of the extrusion surface 21b toward the side of the injection surface 21a, the interval S1 between the adjacent heat insulating portions 31a accordingly gradually increases as approaching from the side of the extrusion surface 21b toward the side of the injection surface 21a.

Here, the interval S1 between the adjacent heat insulating portions 31a corresponds to the interval (distance) in the direction substantially perpendicular to the extending direction of the heat insulating portion 31a. Also, the width W1 of the heat insulating portion 31a corresponds to the width (dimension) in the direction substantially perpendicular to the extending direction of the heat insulating portion 31a. The direction substantially perpendicular to the extending direction of the heat insulating portion 31a is substantially parallel to the thickness direction of the central member 6a. Note that the thickness direction of the central member 6a corresponds to the direction substantially perpendicular to the extrusion surface 21b or the injection surface 21a, and the Z direction shown in FIG. 2 to FIG. 4, FIG. 6, and FIG. 7 is the thickness direction of the central member 6a and is thus the thickness direction of the die 6.

The interval S1 between the adjacent heat insulating portions 31a corresponds to the width of the metal region between the adjacent heat insulating portions 31a. Therefore, the gradual increase of the interval S1 between the adjacent heat insulating portions 31a as approaching from the side of the extrusion surface 21b toward the side of the injection surface 21a which is the second feature means the gradual increase of the width of the metal region between the adjacent heat insulating portions 31a as approaching from the side of the extrusion surface 21b toward the side of the injection surface 21a. Such a structure (the structure in which the width of the metal region between the adjacent heat insulating portions 31a gradually increases as approaching from the side of the extrusion surface 21b toward the side of the injection surface 21a) is suitable for relieving (dispersing) the concentration of force in the metal region between the adjacent heat insulating portions 31a and suppressing the generation of local stress when a load is generated from the side of the extrusion surface 21b toward the side of the injection surface 21a in the die 6.

In the present embodiment, by applying the second feature, it is possible to suppress or prevent the decrease in the mechanical strength of the central member 6a due to the provision of the heat insulating portions 31a, and it is possible to suppress or prevent the deformation of the central member 6a when a load is generated from the side of the extrusion surface 21b toward the side of the injection surface 21a in the die 6. Therefore, the performance of the die 6 and the performance of the extrusion apparatus 1 provided with the die 6 can be improved. Moreover, the quality of the pellets 14 manufactured using the extrusion apparatus 1 can be improved.

Examples of the dimensions of the heat insulating portion 31a are as follows, but the dimensions are not limited to these and can be changed as appropriate. The thickness Ti (see FIG. 8) of each heat insulating portion 31a is, for example, about 3 to 7 mm. Also, the width W1 of each heat insulating portion 31a is, for example, about 5 to 10 mm at the widest point (that is, the position close to the extrusion surface 21b). Further, the closest distance S2 between the adjacent heat insulating portions 31a (corresponding to the distance S1 at the closest position) is preferably about 0.2 to 5 mm, more preferably about 1 mm. If the closest distance S2 between the adjacent heat insulating portions 31a is too small, the strength of the central member 6a decreases, and if the closest distance S2 between the adjacent heat insulating portions 31a is too large, the heat insulating effect is reduced.

Further, the cross-sectional shape of the heat insulating portion 31a is such that the width W1 of the heat insulating portion 31a gradually decreases as approaching from the side of the extrusion surface 21b toward the side of the injection surface 21a. For example, a semi-circular or semi-elliptical shape having the arc shape (convex shape) on the side of the injection surface 21a may be adopted, and FIG. 8 shows such a case.

Further, the arrangement of the plurality of heat insulating portions 31a provided in the central member 6a will be described more specifically as follows. That is, the plurality of heat insulating portions 31a provided in the central member 6a include the plurality of heat insulating portions 31a belonging to a group G1 (first group), the plurality of heat insulating portions 31a belonging to a group G2 (second group), the plurality of heat insulating portions 31a belonging to a group G3 (third group), and the plurality of heat insulating portions 31a belonging to a group G4 (fourth group) (see FIG. 6).

The plurality of heat insulating portions 31a of the group G1 each extend in the X direction and are arranged in the Y direction in plan view. The plurality of heat insulating portions 31a of the group G2 each extend in the Y direction and are arranged in the X direction in plan view. The plurality of heat insulating portions 31a of the group G3 each extend in the X direction, are arranged in the Y direction, and are located on the opposite side of the group G1 with the connection hole 22 interposed therebetween in plan view. The plurality of heat insulating portions 31a of the group G4 each extend in the Y direction, are arranged in the X direction, and are located on the opposite side of the group G2 with the connection hole 22 interposed therebetween in plan view. Here, the X direction and the Y direction are shown in FIG. 2 to FIG. 4, FIG. 6, and FIG. 7. The X direction and the Y direction are substantially parallel to the extrusion surface 21b or the injection surface 21a, and the X direction and the Y direction are orthogonal to each other. Also, the Z direction is orthogonal to the X and Y directions, that is, is the thickness direction of the central member 6a.

By arranging the plurality of heat insulating portions 31a provided in the central member 6a in this manner, it is possible to arrange the plurality of heat insulating portions 31a more efficiently in the central member 6a of the die 6.

In the present embodiment, in order to further suppress or prevent the decrease in the mechanical strength of the central member 6a due to the provision of the heat insulating portions 31a, the arrangement of the plurality of heat insulating portions 31a provided in the central member 6a is devised.

Namely, as the third feature of the present embodiment, in each of the groups G1, G2, G3, and G4, the plurality of heat insulating portions 31a are arranged to have a curved shape (arch shape, arcuate shape) in which the substantially central portion of the arrangement is convex toward the side of the extrusion surface 21b in cross-sectional view (cross-sectional view substantially perpendicular to the extending direction of the heat insulating portion 31a) (see FIG. 7). From another point of view, in each of the groups G1, G2, G3, and G4, the distance L1 (see FIG. 7) from the surface of the central member 6a on the side of the extrusion surface 21b to each of the plurality of heat insulating portions 31a gradually increases as approaching from the center of the arrangement of the plurality of heat insulating portions 31a toward both sides. In this case, as for the distance L1 from the surface of the central member 6a on the side of the extrusion surface 21b to the heat insulating portion 31a, a distance L1b at the position closer to both sides of the arrangement of the heat insulating portions 31a is larger than a distance L1a at the position closer to the center of the arrangement of the heat insulating portions 31a (that is, $L1a<L1b$). Such an arrangement of the plurality of heat insulating portions 31a is suitable for relieving (dispersing) the concentration of force and suppressing the generation of local stress when a load is generated from the side of the extrusion surface 21b toward the side of the injection surface 21a in the die 6.

Note that FIG. 7 shows a cross section across the plurality of heat insulating portions 31a of the group G4, which corresponds to a cross section perpendicular to the Z direction and substantially perpendicular to the extending direction (here, the Y direction) of the plurality of heat insulating portions 31a of the group G4. The cross section across the plurality of heat insulating portions 31a of the group G1, the cross section across the plurality of heat insulating portions 31a of the group G2, and the cross section across the plurality of heat insulating portions 31a of the group G3 are also substantially the same as that in FIG. 7. Further, since FIG. 7 is a schematic diagram showing the arrangement of the heat insulating portions 31a, the illustration of the portions other than the heat insulating portions (31a) may be omitted.

In the present embodiment, by applying the third feature, it is possible to suppress or prevent the decrease in the mechanical strength of the central member 6a due to the provision of the heat insulating portions 31a, and it is possible to suppress or prevent the deformation of the central member 6a when a load is generated from the side of the extrusion surface 21b toward the side of the injection surface 21a in the die 6. Therefore, the performance of the die 6 and the performance of the extrusion apparatus 1 provided with the die 6 can be improved. Moreover, the quality of the pellets 14 manufactured using the extrusion apparatus 1 can be improved.

Moreover, the heat insulating layer 31 further includes a plurality of heat insulating portions 31b extending in the thickness direction of the central member 6a (Z direction) inside the central member 6a. As with the heat insulating portion 31a, the heat insulating portion 31b is also composed of a hole (cavity) provided in the central member 6a and a gas existing inside the hole (cavity). The plurality of heat insulating portions 31b provided inside the central member 6a are connected to inner ends (ends on the side closer to the connection hole 22) of the plurality of heat insulating portions 31a, respectively. Specifically, the inner ends of the plurality of heat insulating portions 31a are each connected (coupled) to the ends of the plurality of heat insulating portions 31b (ends on the side closer to the extrusion surface 21b). Therefore, each heat insulating portion 31b extends from the end connected to the heat insulating portion 31a toward the injection surface 21a along the thickness direction of the central member 6a (Z direction). The plurality of heat insulating portions 31b may be connected by an annular heat insulating portion or the like.

Since the heat insulating layer 31 includes not only the heat insulating portions 31a but also the heat insulating portions 31b, the heat insulating effect by the heat insulating layer 31 can be enhanced. In addition, since the heat insulating portions 31a and the heat insulating portions 31b are connected (spatially connected), it becomes easy to set the pressure inside the heat insulating portions 31a and 31b to a reduced pressure lower than the atmospheric pressure or vacuum.

In addition, the hole constituting the heat insulating portion 31b may reach the surface of the central member 6a on the side of the injection surface 21a, but in that case, it is preferable that the hole constituting the heat insulating portion 31b is closed (blocked) at the surface of the central member 6a on the side of the injection surface 21a.

Moreover, the heat insulating layer 31 further includes a heat insulating portion 31c to which the outer peripheral end of each heat insulating portion 31a is connected. Namely, of both ends of the heat insulating portion 31a, the inner end which is the end closer to the central portion (connection hole 22) of the die 6 is connected (coupled) to the heat insulating portion 31b, and the outer peripheral end which is the end farther from the central portion (connection hole 22) of the die 6 (in other words, the side closer to the outer periphery of the die 6) is connected (coupled) to the heat insulating portion 31c. Therefore, the heat insulating portion 31a, the heat insulating portion 31b connected to the inner end of the heat insulating portion 31a, and the heat insulating portion 31c connected to the outer peripheral end of the heat insulating portion 31a are spatially connected. The heat insulating portion 31c surrounds the plurality of heat insulating portions 31a in plan view. In the die 6, one or more heat insulating portions 31c are provided. In the die 6, the heat insulating portion 31c may be provided in the central member 6a, may be provided in the outer peripheral member 6b, or may be provided between the side surface of the central member 6a and the outer peripheral member 6b. The heat insulating portion 31c extends along the thickness direction of the die 6 (Z direction) from the end connected to the heat insulating portion 31a toward the injection surface 21a.

Since the heat insulating layer 31 includes not only the heat insulating portions 31a but also the heat insulating portion 31c, the heat insulating effect by the heat insulating layer 31 can be enhanced. Further, since the heat insulating portion 31a, the heat insulating portion 31b, and the heat insulating portion 31c are connected (spatially connected), it becomes easy to set the pressure inside the heat insulating portions 31a, 31b, and 31c to a reduced pressure lower than the atmospheric pressure or vacuum.

In addition, by surrounding the injection hole 25 and the heat source 26 with the heat insulating portions 31a, 31b, and 31c, the cooling effect from the water tank 11 is blocked by the heat insulating portions 31a, 31b, and 31c, and the resin material inside the injection hole 25 can be easily controlled to an appropriate temperature by the heat source 26. Therefore, it becomes easy to control the viscosity of the resin material inside the injection hole 25 to an appropriate viscosity (low viscosity), so that the clogging in each nozzle 24 can be suppressed or prevented more appropriately.

In addition, it is preferable that the central member 6a is made of a metal material having a high strength because the load is applied by the cutter as described above. However, metal materials with high strength tend to have low toughness and crack easily. Further, since the central member 6a is heated to a high temperature by the heat source 26, thermal expansion occurs to some extent. Therefore, in the present embodiment, the toughness of the outer peripheral member 6b is preferably made higher than that of the central member 6a. Namely, it is preferable that the toughness of the metal material constituting the outer peripheral member 6b is higher than the toughness of the metal material constituting the central member 6a. As a result, even if a metal material with relatively low toughness is selected as the metal material for the central member 6a by giving priority to strength, it becomes easy to prevent the breakage of the die 6 by forming the outer peripheral member 6b from a metal material with high toughness. Further, even if the central member 6a thermally expands due to heating by the heat source 26, it is easy to prevent the breakage of the die 6 because the expansion can be absorbed by the high toughness of the outer peripheral member 6b. As for the toughness, it is possible to determine that the toughness is high when the elongation is large in the tensile test or the impact value is large in the impact test.

<Method of Manufacturing Die 6>

Although the central member 6a of the die 6 in the present embodiment can be manufactured by various methods, it is particularly suitable to manufacture it with a 3D printer. Examples of the manufacturing method using a 3D printer include the powder bed fusion method in which powder made of a metal material is spread in layers and the powder is directly sintered by a high-output laser beam or electron beam, the binder jetting method in which a binder is added to powder by an ink-jet method to solidify them, and the fused deposition modeling method in which metal discharged from a nozzle is melted and laminated.

Immediately after manufacturing the central member 6a, the heat insulating layer 31, the heat source 26, and the heat sensor 27 are merely holes (spaces) formed inside the central member 6a. However, in order to make the description easily understood, these holes will be described below as each of the above configurations.

Before or after manufacturing the central member 6a with a 3D printer, the outer peripheral member 6b and the hard plate 6c are prepared. The outer peripheral member 6b and the hard plate 6c are manufactured separately from the central member 6a, but they may also be manufactured using a 3D printer.

After the central member 6a, the outer peripheral member 6b, and the hard plate 6c are prepared, the central member 6a and the outer peripheral member 6b are joined together and the central member 6a is surrounded by the outer peripheral member 6b as described above.

Also, the central member 6a and the hard plate 6c are connected (joined) together, and the hard plate 6c is provided on the surface of the central member 6a on the side of the extrusion surface 21b.

In this way, the die 6 in the present embodiment is manufactured.

By manufacturing the central member 6a with a 3D printer, the hollow heat insulating layer 31 (heat insulating portions 31a and 31b) can be easily formed inside the central member 6a. Moreover, since the central member 6a including the heat insulating layer 31 is integrally formed, the strength of the entire central member 6a can be increased.

In particular, when the central member 6a is manufactured with a 3D printer, the central member 6a having the plurality of heat insulating portions 31a described above can be manufactured easily and accurately.

In the foregoing, the invention made by the inventors of this application has been specifically described based on the embodiment thereof. However, it is needless to say that the present invention is not limited to the above-described embodiment and various modifications can be made within the range not departing from the gist thereof.

For example, the case in which the central member 6a is formed from a plurality of members is also possible in addition to the case in which the central member 6a is formed from a single member. Also, the case in which the outer peripheral member 6b is formed from a plurality of members is also possible in addition to the case in which the outer peripheral member 6b is formed from a single member. Further, the case in which an integrated member in which the central member 6a and the outer peripheral member 6b are combined is formed is also possible in addition to the case in which the central member 6a and the outer peripheral member 6b are formed as separate members.

REFERENCE SIGNS LIST 1 extrusion apparatus
2 cylinder
3 screw
4 rotation drive mechanism
5 hopper
6 die
6a central member
6b outer peripheral member
6c hard plate
11 water tank
12 cutter holder
13 pelletizer
14 pellet
21a injection surface
21b extrusion surface
22, 23 connection hole
22a, 23a connection member
24 nozzle
25 injection hole
26 heat source
27 heat sensor
31 heat insulating layer
31a, 31b, 31c heat insulating portion
L1 distance
S1 interval
W1 width

The invention claimed is:

1. A die having an extrusion surface and an injection surface on an opposite side of the extrusion surface, the die comprising:
a first member made of a first metal material;
an injection hole formed from a surface of the first member on a side of the injection surface to an inside of the first member;
a plurality of nozzles formed from a surface of the first member on a side of the extrusion surface to the inside of the first member and connected to the injection hole;
a heat source provided inside the first member; and
a plurality of first heat insulating portions provided inside the first member,
wherein the plurality of first heat insulating portions extend from an outer peripheral side of the first member toward an inner side of the first member in plan view, and
a cross-sectional shape of each of the plurality of first heat insulating portions is such that an interval between the first heat insulating portions adjacent to each other gradually increases as approaching from the side of the extrusion surface toward the side of the injection surface.

2. The die according to claim 1,
wherein the plurality of first heat insulating portions radially extend.

3. The die according to claim 1,
wherein each of the plurality of first heat insulating portions is composed of a hole provided in the first member and a gas existing inside the hole.

4. The die according to claim 3,
wherein a pressure of the gas existing inside the hole is an atmospheric pressure, a reduced pressure lower than the atmospheric pressure, or vacuum.

5. The die according to claim 1,
wherein a cross-sectional shape of each of the plurality of first heat insulating portions is such that a width of the first heat insulating portion gradually decreases as approaching from the side of the extrusion surface toward the side of the injection surface.

6. The die according to claim 1,
wherein a first connection hole is provided in a central portion of the first member so as to penetrate the first member,
wherein the plurality of first heat insulating portions include the plurality of first heat insulating portions belonging to a first group, the plurality of first heat insulating portions belonging to a second group, the plurality of first heat insulating portions belonging to a third group, and the plurality of first heat insulating portions belonging to a fourth group,
wherein the plurality of first heat insulating portions belonging to the first group extend in a first direction and are arranged in a second direction orthogonal to the first direction in plan view,
wherein the plurality of first heat insulating portions belonging to the second group extend in the second direction and are arranged in the first direction in plan view,
wherein the plurality of first heat insulating portions belonging to the third group extend in the first direction, are arranged in the second direction, and are located on an opposite side of the first group with the first connection hole interposed therebetween in plan view, and wherein the plurality of first heat insulating portions belonging to the fourth group extend in the second direction, are arranged in the first direction, and are located on an opposite side of the second group with the first connection hole interposed therebetween in plan view.

7. The die according to claim 6,
wherein, in each of the first to fourth groups, the plurality of first heat insulating portions are arranged to have a curved shape which is convex toward the side of the extrusion surface in cross-sectional view perpendicular to an extending direction of the plurality of first heat insulating portions.

8. The die according to claim 1, further comprising
a plurality of second heat insulating portions provided inside the first member,
wherein the plurality of second heat insulating portions are connected to inner ends of the plurality of first heat insulating portions, respectively, and extend in a thickness direction of the first member.

9. The die according to claim 1, further comprising
a plate member provided on the surface of the first member on the side of the extrusion surface and having higher hardness than that of the first metal material,
wherein the nozzles penetrate the plate member.

10. The die according to claim 1, further comprising
a second member made of a second metal material and joined to the first member so as to surround the first member in the plan view.

11. The die according to claim 10,
wherein a third heat insulating portion is provided between the first member and the second member, and
wherein outer peripheral ends of the plurality of first heat insulating portions are connected to the third heat insulating portion.

12. The die according to claim 10,
wherein toughness of the second metal material is higher than that of the first metal material.

13. The die according to claim 1,
wherein the injection hole is located between the surface of the first member on the side of the injection surface and the plurality of first heat insulating portions.

14. The die according to claim 13,
wherein the plurality of nozzles pass between the plurality of first heat insulating portions.

15. The die according to claim 1,
wherein the heat source is located between the surface of the first member on the side of the injection surface and the plurality of first heat insulating portions.

16. An extrusion apparatus provided with the die according to claim 1, the extrusion apparatus comprising:
a cylinder in which a screw is provided;
the die having the injection surface to which the cylinder is connected; and
a cutter holder having a plurality of cutters provided so as to face the extrusion surface of the die.

17. A method of manufacturing pellets using the extrusion apparatus according to claim 16, the method comprising:
(a) supplying a resin material into the cylinder;
(b) injecting the resin material kneaded in the cylinder into the injection hole of the die from the side of the injection surface;
(c) extruding the resin material injected into the injection hole from the plurality of nozzles; and
(d) cutting the resin material extruded from the nozzles by the cutters, thereby obtaining a plurality of pellets made of the resin material, wherein the (c) and the (d) are performed in a state where the heat source is being driven.

18. A method of manufacturing a die, the method comprising:
(a) preparing a first member manufactured using a 3D printer, having an extrusion surface and an injection surface on an opposite side of the extrusion surface, and made of a first metal material;
(b) preparing a second member made of a second metal material;
(c) preparing a plate member having a higher hardness than that of the first metal material;
(d) joining the second member to the first member so as to surround the first member in plan view seen from a side of the extrusion surface; and
(e) joining the plate member to a surface of the first member on the side of the extrusion surface,
wherein the first member includes:
an injection hole formed from a surface of the first member on a side of the injection surface to an inside of the first member;
a plurality of nozzles formed from a surface of the first member on a side of the extrusion surface to the inside of the first member and connected to the injection hole;
a heat source provided inside the first member; and
a plurality of first heat insulating portions provided inside the first member, and
wherein the plurality of first heat insulating portions extend from an outer peripheral side of the first member toward an inner side of the first member in plan view, and
a cross-sectional shape of each of the plurality of first heat insulating portions is such that an interval between the first heat insulating portions adjacent to each other gradually increases as approaching from the side of the extrusion surface toward the side of the injection surface.

19. A die having an extrusion surface and an injection surface on an opposite side of the extrusion surface, the die comprising:
an injection hole formed from the injection surface to an inside of the die;
a plurality of nozzles formed from the extrusion surface to the inside of the die and connected to the injection hole;
a heat source provided inside the die; and
a plurality of first heat insulating portions provided inside the die,
wherein the plurality of first heat insulating portions extend from a central portion of the die toward an outer peripheral side in plan view, and
a cross-sectional shape of each of the plurality of first heat insulating portions is such that an interval between the first heat insulating portions adjacent to each other gradually increases as approaching from the side of the extrusion surface toward the side of the injection surface.

20. The die according to claim 19,
wherein the plurality of first heat insulating portions radially extend.

21. The die according to claim 19,
wherein each of the plurality of first heat insulating portions is composed of a hole provided in the die and a gas existing inside the hole.

22. The die according to claim 19,
wherein a cross-sectional shape of each of the plurality of first heat insulating portions is such that a width of the first heat insulating portion gradually decreases as approaching from a side of the extrusion surface toward a side of the injection surface.

23. The die according to claim 19,
wherein a first connection hole is provided in a central portion of the die so as to penetrate the die,
wherein the plurality of first heat insulating portions include the plurality of first heat insulating portions belonging to a first group, the plurality of first heat insulating portions belonging to a second group, the plurality of first heat insulating portions belonging to a third group, and the plurality of first heat insulating portions belonging to a fourth group,
wherein the plurality of first heat insulating portions belonging to the first group extend in a first direction and are arranged in a second direction orthogonal to the first direction in plan view,
wherein the plurality of first heat insulating portions belonging to the second group extend in the second direction and are arranged in the first direction in plan view,
wherein the plurality of first heat insulating portions belonging to the third group extend in the first direction, are arranged in the second direction, and are located on an opposite side of the first group with the first connection hole interposed therebetween in plan view, and
wherein the plurality of first heat insulating portions belonging to the fourth group extend in the second direction, are arranged in the first direction, and are located on an opposite side of the second group with the first connection hole interposed therebetween in plan view.

24. The die according to claim 23,
wherein, in each of the first to fourth groups, the plurality of first heat insulating portions are arranged to have a curved shape which is convex toward a side of the extrusion surface in cross-sectional view perpendicular to an extending direction of the plurality of first heat insulating portions.

25. The die according to claim 19, further comprising
a plurality of second heat insulating portions provided inside the die,
wherein the plurality of second heat insulating portions are connected to inner ends of the plurality of first heat insulating portions, respectively, and extend in a thickness direction of the die.

26. The die according to claim 19, further comprising
a third heat insulating portion provided inside the die and extending in a thickness direction of the die,
wherein outer peripheral ends of the plurality of first heat insulating portions are connected to the third heat insulating portion.

* * * * *